Feb. 11, 1969  F. C. FIELD, JR  3,427,647
WRAPPED YARN PRODUCT AND PROCESS FOR PREPARING WRAPPED YARNS
Filed March 19, 1968  Sheet 1 of 2
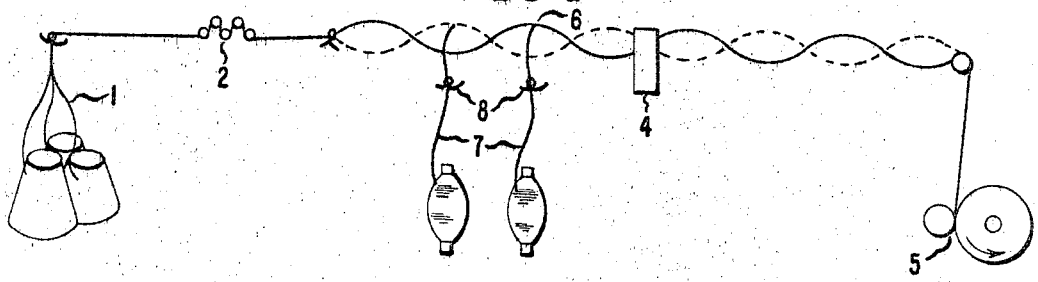
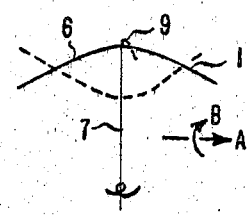
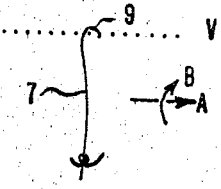
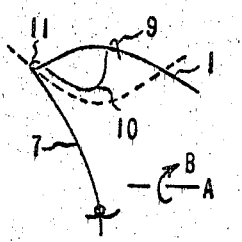
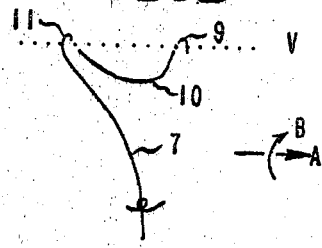
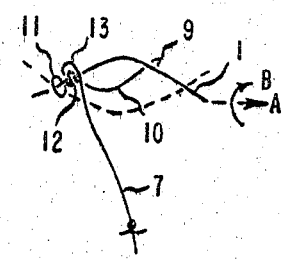
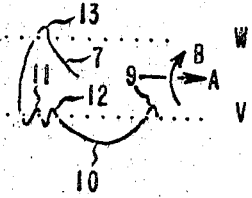
INVENTOR
FREDERICK C. FIELD, JR.
BY *E. Leigh Hunt*
ATTORNEY Feb. 11, 1969    F. C. FIELD, JR    3,427,647
WRAPPED YARN PRODUCT AND PROCESS FOR PREPARING WRAPPED YARNS
Filed March 19, 1968
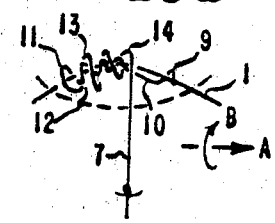
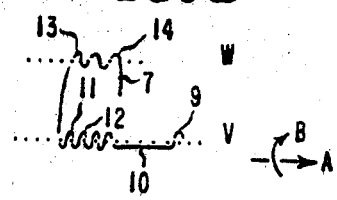
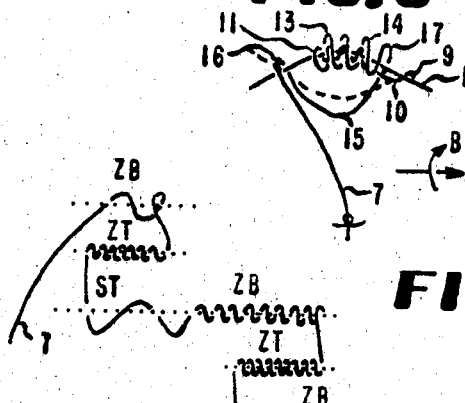
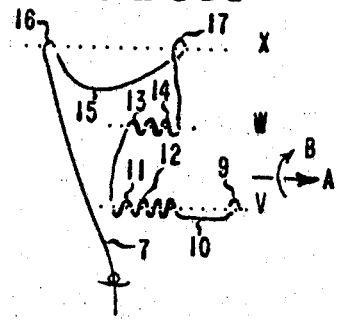
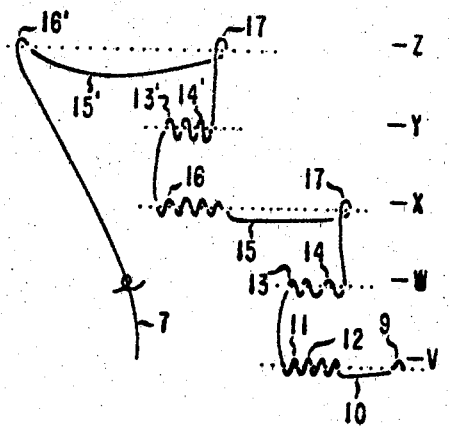
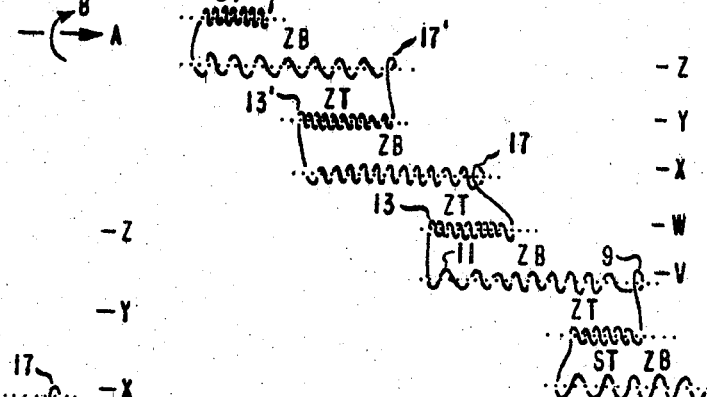
INVENTOR
FREDERICK C. FIELD, JR.
BY    *E. Leigh Hunt*
ATTORNEY

United States Patent Office 3,427,647
Patented Feb. 11, 1969

3,427,647
WRAPPED YARN PRODUCT AND PROCESS FOR PREPARING WRAPPED YARNS
Frederick C. Field, Jr., Wilmington, Del., assignor to E. I. du Pont de Nemours and Company, Wilmington, Del., a corporation of Delaware
Filed Mar. 19, 1968, Ser. No. 714,284
U.S. Cl. 57—144                               25 Claims
Int. Cl. D02g 3/36, 3/02; D01h 13/26

ABSTRACT OF THE DISCLOSURE

A continuously wrapped yarn comprising a continuous core element having a plurality of series of separate continuous wrapping elements with each series comprising wrapping units in a telescoped spatial relationship along the length of the yarn, each of said wrapping units comprising a continuous wrapping element having a varying wrapping frequency forming a first layer of helical-like wrappings having a predominantly unidirectional twist, a tight overwrapped segment formed of said continuous element backwrapped over a portion of said first layer with at least a part of said overwrapped segment having a wrapping direction of rotation opposite to that of said first layer. Also disclosed is a process for producing a continuously wrapped yarn which comprises forming a rotating standing wave pattern of multiple balloons in a core element with twisting means and wrapping separate continuous wrapping elements about separate balloons by freely feeding said wrapping elements to the balloons to form said wrapped yarn.

Background of the invention

This invention provides a simple, high speed, false twisting process for producing novel wrapped yarns. More specifically, it deals with a process for preparing wrapped yarns having true twist-like wrappings suitable for consolidating a twistless core of fibers. The resultant wrapped yarns are characterized by tight, connected, overwrapped segments having high wrapping frequencies.

Twistless bundles of fibers have limited utility until consolidated either by wrapping with a binding yarn or by twisting or ply twisting the bundle into a unit. All of these are slow, expensive processes requiring complicated equipment. There have been some high speed false twisting processes which are capable of wrapping twistless bundles of fibers and thereby consolidating them; however, these require complicated equipment to supply discontinuous fiber for wrapping.

Summary of the invention

From an economic standpoint, an important feature of this invention is the simplicity of the process and equipment suitable for preparing the novel, useful wrapped yarns.

Broadly stated, the process comprises feeding a plurality of separate wrapping yarns at very low tension and substantially 90° to an advancing core being rotated by a false twister to form a rotating standing wave. The standing wave comprises a plurality of "balloons" along the core bundle between the feeding point of the core and the rotating means. The continuous wrapping elements are freely fed simultaneously to separate balloons. These balloons pull an excess of the wrapping yarn to wind open loops about the core. Core rotation winds more of the same wrapping yarn over the wound loops thereby locking the lower layers.

More specifically, the process of this invention is defined as in a process including the steps of continuously advancing a continuous core element, twisting said element with twisting means to form a balloon immediately upstream of said twisting means, and feeding a continuous wrapping element to wrap about the rotating balloon portion of said core, the improvement for producing a wrapped yarn having a continuous wrapping comprising
  (a) Forming a rotating standing wave pattern of multiple balloons in said core element by controlling the tension in said core while guiding said core with guide means spaced a sufficient distance from said twisting means to form said wave pattern; and
  (b) Wrapping separate continuous wrapping elements about separate balloons by freely feeding said wrapping elements to said balloons to form said wrapped yarn.

Various other embodiments exemplified include: twisting means comprising a fluid twister and a mechanical false twister; a continuous core comprising separate continuous elements and a continuous core comprising discontinuous elements; each of the continuous wrapping elements comprising a plurality of continuous elements brought together and also the embodiment wherein said wrapping elements comprise discontinuous elements; and the process utilizing two fluid twisters arranged in series and twisting in opposite directions with the wrapping elements being freely fed upstream of each twister.

The product of this invention is specifically described as a continuously wrapped yarn comprising a continuous core element having a plurality of series of separate continuous wrapping elements with each series comprising wrapping units in a telescoped spatial relationship along the length of the yarn, each of said wrapping units comprising a continuous wrapping element having a varying wrapping frequency forming a first layer of helical-like wrappings having a predominantly unidirectional twist, a tight overwrapped segment formed of said continuous element backwrapped over a portion of said first layer with at least a part of said overwrapped segment having a wrapping direction of rotation opposite to that of said first layer.

Description of the drawings

The process can be clarified by the explanation of the accompanying drawings.

FIGURE 1 is a side elevation of one form of carrying out this invention.

FIGURES 2–6 show the theoretical steps by which a core is wrapped by this novel process.

FIGURES 7–11 are alternate equivalents to FIGURES 2–6 wherein the various layers are separated from the core.

FIGURE 12 is a theoretical schematic representation of the wrapped yarn upstream of the twisting element.

FIGURE 13 is a schematic representation of a completed wrapped yarn.

For simplicity FIGURES 2–13 show only a single wrapping element whereas the products and process of this invention are concerned with multiple wrapping elements. It is to be understood that applicant's theory applies to each wrapping element.

Description of the preferred embodiment

Referring now to FIGURE 1, core yarn 1 is fed through tension control means 2 to a false twisting device 4 and then wound up as a wrapped yarn 5. Between the feed point 2 and the false twisting device 4, a rotating, standing wave is formed made up of balloons as 6. A similar wave can be formed downstream of the false twisting device 4. A plurality of wrapping yarns 7 are freely fed through guides 8 to the core under substantially no tension. The core balloons pull excess of wrapping yarns 7 and causes them to be wrapped about the core as shown in FIGURES 2–12.

FIGURES 2-6 utilize a single core balloon 6 to demonstrate theoretical steps by which the wrapping process can take place. FIGURES 7-11 are alternate equivalents to FIGURES 2-6 wherein the wrapping yarn has been separated into its component layers. These layers have been labeled V, W, X, Y, and Z, and if superimposed vertically, they would show the complete yarn structure with V representing the layer nearest the core. This alternate technique has been employed because it permits illustration of more layers than would be possible on the balloon of FIGURES 2-6. The core yarn of FIGURES 2-11 is moving as shown by arrows A and B. For the purpose of this illustration, it has been assumed that one rotation of the balloon is accompanied by one rotation of the core about its axis.

It is to be understood that applicant does not intend to be bound by any theory but the theory presented herein seems to be the most plausible one. The process claims specify the actual steps performed in practicing the invention and the product claims are descriptive of the final novel product of the invention without regard to applicant's theory.

Wrapping element 7 is fed (FIGURES 2 and 7) to the core at point 9. It is most convenient to startup the process by first starting advancement of the core and allowing the core to pull the wrapping elements through the twister and then starting the twister after which the process will resemble the illustration of FIGURE 1. Rotation of the balloon pulls an excess of the low tensioned wrapping yarn 7 to cast open loop 10 along the core yarn to be supported at the node (point of minimum motion) forming the beginning of wrap 11 (FIGURES 3 and 8). Further rotation of the balloon causes open loop 10 to wind around the core one turn to form wrap 12 (FIGURES 4 and 9) while the accompanying rotation of the core winds element 7 about the core in the conventional manner forming wrap 13 over wraps 11 and 12, (FIGURES 4 and 9). In contrast, the balloon rotation and core rotation exactly balance on the downstream end of loop 10 causing no net change at point 9. This continues until the excess of loop 10 is used up or until wrapping element 7 reaches a position that will make it cast another open loop (near the peak of a balloon). FIGURES 5 and 10 show such a condition with 14 being the last wrap formed on the outside layer. A new open loop 15 is now cast supported at the node and forming wraps 16 and 17 equivalent to wrap 11 and point 9 respectively and the process is repeated (FIGURES 6 and 11). Formation of additional wraps is shown in FIGURE 12 in which the wraps are separated into the respective layers. If the balloon rotated faster than the core, balloon wrapping would also take place at 9 (FIGURES 4 and 9). If the core rotated faster than the balloon, some of the wrappings 13, 14 would be unwound during balloon rotation (FIGURES 6 and 11). The additional wraps in FIGURE 12 are designated by prime numbers as the same theoretical wrapping steps occurring in the earlier steps are repeated.

The twisting of the core itself in this upstream portion has not been shown for simplicity of the drawings but it would be S twist as wraps 11 and 12. Downstream of the false twister, the core would untwist back to substantially its original state. As a result of twist transference from the core to the wrapping similar to that described in U.S. Patent 3,079,746, to Field, dated March 5, 1963, the wraps similar to 11 and 12 (S) would be substantially unwound, the wraps similar to 13 and 14 (Z) would be more tightly secured and the segments like 10 and 15 would be wound (Z). Each series of wrapping elements in the final product would resemble FIGURE 13 which is an analysis of the product made by Example 2. On FIGURE 13, the segment lengths and the wrapping frequencies have been drawn approximately to scale. The direction of the wrappings (S or Z), and the location of the loose wrapping element while the yarn was being unwound (Top or Bottom) has been marked on each segment. The wrapping element was sometimes found on the top of the yarn and sometimes found on the bottom of the yarn requiring rotation of the core counterclockwise or clockwise, respectively, to remove it due to the loop wrapping by open loops.

The yarn of FIGURE 13 has segments of three layers having high wrapping frequencies. The segments in between have lower wrapping frequencies. A twistless core composed of one or more yarns can be consolidated when the wrapping frequencies and their tightness are high enough. Tight wrappings produce yarns of about minimum circumference (e.g., round). This usually occurs when the wrap ratio is 2.0 or greater. Wrap ratio is the quotient of the difference between the final wrapped yarn denier and the core denier as fed divided by the total denier of the wrapping yarns fed. Normally this also produces a stable wrapping, that is, one which can not readily be moved with finger tension more than about ½ inch along the axis of the product. In the more desirable products of this invention, the core is completely covered and hidden by the wrappings.

The distances between the overwrapped segments of high wrapping frequencies, their length, their tightness and the wrap ratio can be controlled by a number of processing factors including the core yarn tension, denier, forwarding speed, rotational velocity and the number and denier of the wrapping yarns. It has generally been found that the wrapping frequencies between any pair of overwrapped segments has a gradient, being higher in its downstream direction and lower in its upstream direction. It is also in the opposite direction to that originally inserted to the core. The wrapping frequency gradient is probably caused by the untwisting of the upstream wrapping (i.e., 11 and 12 in the figures) and the tightening of the downstream wrappings (i.e., 10 and 15 in the figures) as mentioned earlier. The overwrapped segments are also predominantly of a wrapping direction opposite to that originally inserted to the core. There may be some wrapping in the same direction but this normally constitutes a minor portion. The wrapping frequency can be high enough to produce a helix angle of about 90°. The wrapping will appear to have been wound both over the top and under the bottom of the yarn as if the yarn had been rotated in more than one direction. The wrapping will also have a zigzag motion as if the wrapping yarn feed point were being traversed, with loops frequently forming at the reversal of this zigzag motion.

A false twister is the preferred twisting means of this invention, but a true twister (e.g., ring and traveler) could be employed if desired. A false twister is preferred because it is structurally simple and permits high speed operation. The apparati could consist of delivery means (including tension device), false twisting means, (either mechanical or torque jet), windup means, and thread guide means for the wrapping elements (located between the feed of the core and the false twist means). Higher speeds are possible with false twisters than with conventional twisting elements as a result of the high revolutions per minute possible with false twisters, specially of the torque jet type. Furthermore, false twisters permit preparation of cordage yarns having twistless cores which provide higher strength and lower elongation than are possible with cores containing twist.

If the false twisting element is a torque jet, these have a peculiar effect on the overwrapped segments of high wrapping frequencies of this invention, presumably due to the extremely high twisting rate. This effect consists of consolidating the length of that zone to a very short space. The resultant entanglement of the wrappings make these segments nearly impossible to unwind. When mechanical false twisters are used, these zones can more easily be unwound to exemplify the structure by diagrams as FIGURE 13. This effect might be a function of speed more than the type of twister used. In this invention more than one false twister can be used in series and rotating in opposite directions to permit wrapping of both S and Z twist. This provides a wrapped yarn that is more nearly balanced and therefore not lively. The wrappings on the wrapped yarn of this invention can be considered to be of the true twist type, since unidirectional rotation often creates liveliness in the yarn.

Suitable raw materials for making the yarns of this invention include all natural, regenerated, and synthetic fibers or combinations thereof. More than one composition can be used in either the core or as wrapping elements. Structurally, any of the members can be in the form of continuous filaments, plexi-filaments, slit films, spun yarns, or any of the wrapped yarns. This is true for both the core elements as well as the wrapping. The core can also be a roving, a sliver or other bulky forms. Suitable synthetic fibers include polyamides such as poly-(epsilon caproamide) and poly(hexamethylene adipamide), poly-(undecanoamide) and poly(heptanoamide); cellulose esters, e.g., cellulose acetate, polyesters, particularly polyesters of terephthalic acid or isophthalic acid and a lower glycol, e.g., poly(ethylene terephthalate), poly(hexahydro-p-xylylene terephthalate); polyalkylenes, e.g., polyethylene, polypropylene, linear polyacrylonitrile, as well as copolymers of acrylonitrile and other copolymerizable monomers (e.g., methylmethacrylate or vinyl acetate). Copolymers of ethylene terephthalate containing less than 15% combined monomers other than ethylene terephthalate and copolymerizable with ethylene terephthalate are also useful in practicing this invention. Also useful in the practice of this invention are spandex fibers and yarns, multi-component fibers such as described in Taylor U.S. Patent No. 3,038,237 and Breen U.S. Patent No. 3,038,236, as well as poly(metalphenylene isophthalmide), and polybenzimidazole. Other compositions which are suitable for the two types of feed materials include metal fibers, glass fibers, and asbestos fibers.

The present invention provides a wide variety of different yarn structures made from different fiber compositions. The wrapped yarns are useful for preparing a number of different types of woven, knitted, nonwoven, and tufted fabrics, for the industrial textile field as well as the apparel and homefurnishings textile fields. Products which may be made include sewing thread and wicks; also yarns for use in industrial fabrics, coated fabrics, industrial hose reinforcement, fire hose, industrial belts, conveyor belts, V-belts and webbing; yarns for cordage applications including ropes, tire cord, industrial and household cords and twines, including twine for machine tying of magazines, mail and the like, baler twine and hand twine; home furnishings uses including upholstery, carpets, draperies and towels; and specialty wrapped yarns such as bouclé and nub yarns for use as an effect thread in styling different types of fabrics, and the like.

EXAMPLES

The following examples are given to exemplify the invention including the effect of standing wave rotation, wrap yarn tension, consolidation variations, and general process versatility. Unless otherwise specified in the examples, the following criteria are met:

(a) All wrapping yarns fed substantially tensionless ($<5$ mg./denier)

(b) Same amount of wrap yarn fed upstream of each twister employed (c) Multiple wrap yarns are fed ½ inch apart—center end is fed 6 inches upstream of twister—½ inch from core (d) First twister located about 1 ft. downstream of core tension control device and second twister was about 1 ft. downstream of the first.

(e) All fluid pressures are gauge.

(f) All core and wrapping yarns are of continuous filaments.

For simplicity and convenience in the presentation of the examples, they are presented in tabular form.

Table I shows the apparatus and processing conditions untilized for each example.

Table II describes the various elements used as the core and wrapping yarns as well as some of the final wrapped yarn properties.

The apparatus and yarn forming elements are arranged similarly to the schematic of FIGURE 1. The torque jets utilized are of stainless steel.

TABLE I

| Example | Twisting Apparati | Twister Drive | Core tension, mg./den. | Windup speed, yds./min. | Miscellaneous |
|---|---|---|---|---|---|
| 1 | Hollow spindle-mechanical false twister S twist up stream, ⅛ in. inside diameter, ¹⁄₁₆ in. fixed pin. | 10,000 r.p.m. | 50 to 60 ~14 | 16 | Core r.p.m. = balloon r.p.m. = twister r.p.m. [∴ 17 turns per inch (t.p.i.) upstream on core]. |
| 2a | Crank type-hollow spindle mechanical false twister, S twist upstream, ⅜ in. outside, ⅛ in. inside diameter, ⅛ in. opening on side. | 3,600 r.p.m. | 50 to 60 | 10 | (Product sketch in Fig. 13) Balloon r.p.m. = twister r.p.m.; core r.p.m. estimated = twister r.p.m. (∴ 10 t.p.i. upstream on core). |
| 2b | Same as 2a | 3,600 r.p.m. | 50 to 60 | 5.3 | Balloon r.p.m.=twister r.p.m.; Core r.p.m. estimated=twister r.p.m. (∴ 19 t.p.i. upstream on core). |

| Example | Twisting Apparati | 1st (p.s.i.) | 2nd (p.s.i.) | Core tension, mg./den. | Windup speed, yds./min. | Miscellaneous |
|---|---|---|---|---|---|---|
| 3 | 2 Torque jets in line: 1st jet—¼ in. bore, ⅛ in. orifice, ⅜ in. long, S twist upstream. 2nd jet—same as first only Z twist upstream. | 20 | 15 | Snub bars | 37 | 557 Lea Product.¹ |
| 4 | | 20 | 15 | | 37 | 1060 Lea Product.¹ |
| 5 | | 20 | 15 | | 37 | 180 Lea Product.¹ |
| 6 | | 35 | 30 | | 37 | 1050 Lea Product.¹ |
| 7 | 2 Torque jets in line: 1st jet—¼ in. bore, ⅛ in. orifice, ⅜ in. long, S upstream; 2 in. extension upstream with ¼ in. bore; ½ in. extension downstream with ⁵⁄₃₂ in. bore. 2nd jet—same as 1st only Z upstream. | 75 | 75 | 20–25 | 73 | 2.4 in. between overwrapped segments. 2.6 t.p.i. S between above. |
| 8 | 2 Torque jets in line: 1st jet—¼ in. bore, ⅛ in. diameter orifice, ⅜ in. long, S upstream; 1 in. extension upstream with ⁷⁄₃₂ in. bore, ½ in. extension downstream with ⁵⁄₃₂ in. bore. 2nd jet—same as 1st only Z upstream. | 75 | 75 | 20–25 | 37 | |
| 9 | | | | | 37 | |
| 10 | | | | | 37 | |
| 11 | | | | | 126 | |
| 12 | | | | | 126 | |
| 13 | | | | | 126 | |
| 14 | | | | | 250 | |
| 15 | | | | | 250 | |
| 16 | | | | | 250 | |

TABLE I—Continued

| Example | Twisting Apparati | Twister Drive | Core tension, mg./den. | Windup speed, yds./min. | Miscellaneous |
|---|---|---|---|---|---|
| 17 | 2 Torque jets in line: Same as Ex. 8–16. | 50 | 50 | 20–25 | 125 | ~1,000 r.p.m. balloon. |
| 18 | | 75 | 75 | 20–25 | 125 | |
| 19 | | 100 | 100 | 20–25 | 125 | |
| 20 | | 125 | 125 | 20–25 | 125 | ~1,400 r.p.m. balloon. |
| 21 | | 150 | 150 | 20–25 | 125 | |
| 22 | | 50 | 50 | 55–65 | 37 | 980 r.p.m. balloon; ~6 balloons. |
| 23, 27, 28 | | 125 | 125 | 55–65 | 37 | 1,400 r.p.m. balloon; ~12 balloons. |
| 24 | | 125 | 125 | 25–35 | 37 | 1,150 r.p.m. balloon; >20 balloons. |
| 25 | | 0 | 75 | 55–65 | 37 | No wrapping—balloon unable to cast loop. |
| 26 | 2 Torque jets in line: 1st jet—3/16 in. bore, 3/32 in. orifice, 3/8 in. long, S twist upstream; 1 in. extension upstream with 3/16 bore, 1/2 in. extension downstream with 1/8 in. bore. 2nd jet—same as 1st only Z twist upstream. | 75 | 75 | 35–50 | 37 | |

[1] Used for tufted carpet pile and upholstery fabric filling.

TABLE II

| | Core Feed[1] | Wrap Yarn Feed[1] | Final Denier | Wrap Ratio | Wrap Tightness |
|---|---|---|---|---|---|
| Example: | | | | | |
| 1 | 3 ends, 70 denier, 2 d.p.f. nylon; 1 end, 840 denier, 6 d.p.f. nylon (1050). | 1 end, 70 denier, 2 d.p.f. nylon; fed 5 inches from core and 3 inches upstream of single twister (70). | | | |
| 2a | 4 ends, 70 denier, 2 d.p.f. nylon; 1 end, 150 denier, 4 d.p.f. nylon (430). | Same as Example 1 | 550 | 1.7 | Fair. |
| 2b | Same as 2a | ...do... | 660 | 3.3 | Excellent. |
| 3 | 1 end "Wool Card Roping," of 4.2 grain/yd. made of 18 denier Du pont Type 813 nylon staple having a cut length of 4.5 in. (2680). | 1 end to each twister, 70 denier, 2 d.p.f. nylon (140). | 2,950 | 1.9 | |
| 4 | | 2 ends to each twister, 70 denier, 2 d.p.f. nylon (280). | 3,550 | 3.1 | |
| 5 | | 3 ends to each twister, 15 denier, monofilament nylon (90). | 2,800 | 1.3 | |
| 6 | | 3 ends to each twister, 15 denier, monofilament nylon (90). | 2,850 | 1.9 | |
| 7 | 5 ends, 2000 denier, 2 d.p.f. nylon | 1 end, 70 denier, 2 d.p.f. nylon fed between jets only (70). | 10,300 | 4.3 | Good. |
| 8 | 10 ends, 2000 denier, 2 d.p.f. nylon | Fed to each twister: 8 ends, 70 denier, 2 d.p.f. nylon (1120). | 22,700 | 2.4 | Do. |
| 9 | 6 ends, 2000 denier, 2 d.p.f. nylon | | 15,900 | 3.5 | Do. |
| 10 | 3 ends, 2000 denier, 2 d.p.f. nylon | | 10,000 | 3.6 | Excellent. |
| 11 | 10 ends, 2000 denier, 2 d.p.f. nylon | | 21,500 | 1.3 | Poor. |
| 12 | 6 ends, 2000 denier, 2 d.p.f. nylon | | 14,050 | 1.8 | Fair. |
| 13 | 3 ends, 2000 denier, 2 d.p.f. nylon | | 8,600 | 2.3 | Good. |
| 14 | 6 ends, 2000 denier, 2 d.p.f. nylon | | 13,650 | 1.5 | Poor. |
| 15 | 3 ends, 2000 denier, 2 d.p.f. nylon | | 7,400 | 1.2 | Fair. |
| 16 | 1 end, 2000 denier, 2 d.p.f. nylon | | 3,800 | 1.6 | Do. |
| 17 | 4 ends, 2000 denier, 2 d.p.f. nylon | Fed to each twister: 2 ends, 70 denier, 2 d.p.f. nylon (280). | 8,450 | 1.6 | Poor. |
| 18 | 4 ends, 2000 denier, 2 d.p.f. nylon | | 8,600 | 2.1 | Good. |
| 19 | 4 ends, 2000 denier, 2 d.p.f. nylon | | 8,600 | 2.1 | Do. |
| 20 | 4 ends, 2000 denier, 2 d.p.f. nylon | | 8,800 | 2.9 | Excellent. |
| 21 | 4 ends, 2000 denier, 2 d.p.f. nylon | | 8,950 | 3.4 | Do. |
| 22 | 10 ends, 840 denier, 6 d.p.f., high-tenacity nylon. | Fed to each twister: 8 ends, 70 denier, 2 d.p.f. nylon (1120). | 11,600 | 2.9 | |
| 23 | 10 ends, 840 denier, 6 d.p.f., high-tenacity nylon. | | 14,350 | 5.3 | |
| 24 | 10 ends, 840 denier, 6 d.p.f., high-tenacity nylon. | | 12,400 | 3.6 | |
| 25 | 10 ends, 840 denier, 6 d.p.f., high-tenacity nylon. | 1 end, 70 denier, 2 d.p.f. nylon with about 1/2 gm. tension. Fed between jets only (70). | 8,500 | 1.4 | |
| 26 | Fed to each jet: 2 ends, 840 denier, 6 d.p.f. nylon. 2 ends, 1300 denier, 19 d.p.f. nylon (4280). | 1 end, 89 denier fasciated yarn of 100% Orlon® discontinuous fibers (178). Prepared as per U.S. Patent 3,079,746. | 5,380 | 6.2 | |
| 27 | 10 ends, 840 denier, 6 d.p.f., polypropylene. | Same as Ex. 22–24 | ~14,000 | ~5 | |
| 28 | Same as Example 27 | Fed to each twister: 8 ends, 70 denier, 2 d.p.f. polyester filaments (1120). | ~14,000 | ~5 | |

[1] Number in parenthesis is total denier fed.

The products of Examples 3, 4 and 6 are useful for tufted carpet pile or upholstery fabric filling. The products of Examples 7, 8, 9, 10, 13 and 18 through 21 are useful for cable filling. The products from Examples 22 through 24 are useful for cordage manufacture.

The wrapped yarns of the present invention are particularly desirable for preparing stranded rope structures by the process described in the pending U.S. patent application Serial Number 650,438, filed June 30, 1967, by V. S. VanScoy. The wrapped yarns of the present invention are readily substituted for the wrapped yarns used in the above mentioned VanScoy application. The high tenacity, heavy denier wrapped yarn of applicant's Example 23 yields a high tenacity rope by the VanScoy process.

Since many different embodiments of the invention may be made without departing from the spirit and scope thereof, it is to be understood that the invention is not limited by the specific illustrations except to the extent defined in the following claims.

What is claimed is:

1. A continuously wrapped yarn comprising a continuous core element having a plurality of series of separate continuous wrapping elements with each series comprising wrapping units in a telescoped spatial relationship along the length of the yarn, each of said wrapping units comprising a continuous wrapping element having a varying wrapping frequency forming a first layer of helical-like wrappings having a predominantly unidirectional twist, a tight overwrapped segment formed of said continuous element backwrapped over a portion of said first layer with at least a part of said overwrapped segment having a wrapping direction of rotation opposite to that of said first layer.

2. The yarn as in claim 1 wherein said first layer and said overwrapped segment are bridged by a slackened loop.

3. The yarn as in claim 1 wherein said continuous core element comprises a plurality of continuous elements brought together to form a substantially twistless core bundle consolidated by said wrapping elements to form a compact wrapped yarn.

4. The yarn as in claim 1 wherein said continuous wrapping elements comprise a plurality of a continuous elements brought together to form a single wrapping bundle.

5. The yarn as in claim 1 wherein said continuous core element comprises discontinuous elements.

6. The yarn as in claim 1 wherein said continuous wrapping elements comprise discontinuous elements.

7. The yarn as in claim 1 wherein both said continuous core element and continuous wrapping element comprise a polyamide.

8. The yarn as in claim 1 wherein said continuous core element comprises polypropylene and said continuous wrapping elements comprise a polyamide.

9. The yarn as in claim 1 wherein said continuous core element comprises polypropylene and said continuous wrapping elements comprise a polyester.

10. The yarn as in claim 1 wherein said backwrapped portion is less than about 50% of said first layer length and of a length of less than about 0.5 inch.

11. The yarn as in claim 1 having a wrap ratio of greater than about 2.

12. The yarn as in claim 1 wherein said overwrapped segment is at a high wrapping frequency forming wraps of substantially 90 degrees wrap angle with respect to said core element.

13. The yarn as in claim 1 wherein the predominant twist direction of the wrappings in at least one series is Z and in at least one other series is S.

14. A continuously wrapped yarn comprising a continuous core element having a plurality of series of separate continuous wrapping elements with each series comprising wrapping units in a telescoped spatial relationship along the length of yarn, each of said wrapping units comprising a continuous wrapping element forming a first layer of helical-like wrappings having a predominantly unidirectional twist, a second layer formed of said continuous element backwrapped with a wrapping direction of rotation opposite to that of said first layer over a portion of said first layer and said backwrapped portion having a substantially higher wrapping frequency than said first layer, said first layer wrappings being predominantly of the same direction as said second layer twist direction.

15. In a process including the steps of continuously advancing a continuous core element, twisting said element with twisting means to form a balloon immediately upstream of said twisting means, and feeding a continuous wrapping element to wrap about the rotating balloon portion of said core, the improvement for producing a wrapped yarn having a continuous wrapping comprising
(a) forming a rotating standing wave pattern of multiple balloons in said core element by controlling the tension in said core while guiding said core with guide means spaced a sufficient distance from said twisting means to form said wave pattern; and
(b) wrapping separate continuous wrapping elements about separate balloons by freely feeding said wrapping elements to said balloons to form said wrapped yarn.

16. The process as in claim 15 wherein said wrapping elements are fed to said balloons upstream of the twisting means.

17. The process as in claim 15 wherein said twisting means is a fluid twister.

18. The process as in claim 15 wherein said twisting means is a mechanical false twister.

19. The process as in claim 15 wherein said core elements comprise a plurality of separate continuous elements brought together to form a core bundle consolidated by said wrapping elements to form a compact yarn.

20. The process as in claim 15 wherein said wrapping elements comprise a plurality of continuous elements brought together to form a wrapping bundle.

21. The process as in claim 15 wherein said core comprises a continuous element formed of discontinuous elements.

22. The process as in claim 15 wherein said continuous wrapping elements comprise discontinuous elements.

23. In a process including the steps of continuously advancing a continuous core element, twisting said element with a first false twister to form a rotating balloon upstream of said twister, and freely feeding a first continuous wrapping element to wrap about the ballooning portion of said core, the improvement for forming a wrapped yarn comprising
(a) passing said core element through a second false twister arranged downstream of said first twister to form a rotating standing wave pattern upstream of of said second twister, said second twister being adapted to rotate said core in a direction opposite to that of said first twister; and
(b) freely feeding a second continuous wrapping element to said rotating standing wave pattern to wrap about said core in a direction opposite to that of said first wrapping element to form said wrapped yarn.

24. The process as in claim 23 wherein said false twisters are fluid twisters.

25. The process as in claim 24 wherein a standing wave pattern comprising a plurality of balloons is formed upstream of each twister and a plurality of separate continuous elements are freely fed to a plurality of balloons upstream of each twister to form a balanced wrapped yarn.

References Cited

UNITED STATES PATENTS

| | | | |
|---|---|---|---|
| 2,997,837 | 8/1961 | Breen et al. | 57—144 XR |
| 3,079,746 | 3/1963 | Field | 57—144 XR |
| 3,091,913 | 6/1963 | Field | 57—140 |
| 3,158,985 | 12/1964 | Spicer | 57—163 XR |
| 3,336,743 | 8/1967 | Marshall | 57—144 |

JOHN PETRAKES, Primary Examiner.

U.S. Cl. X.R.

57—34, 140, 160, 157